Figure 4:
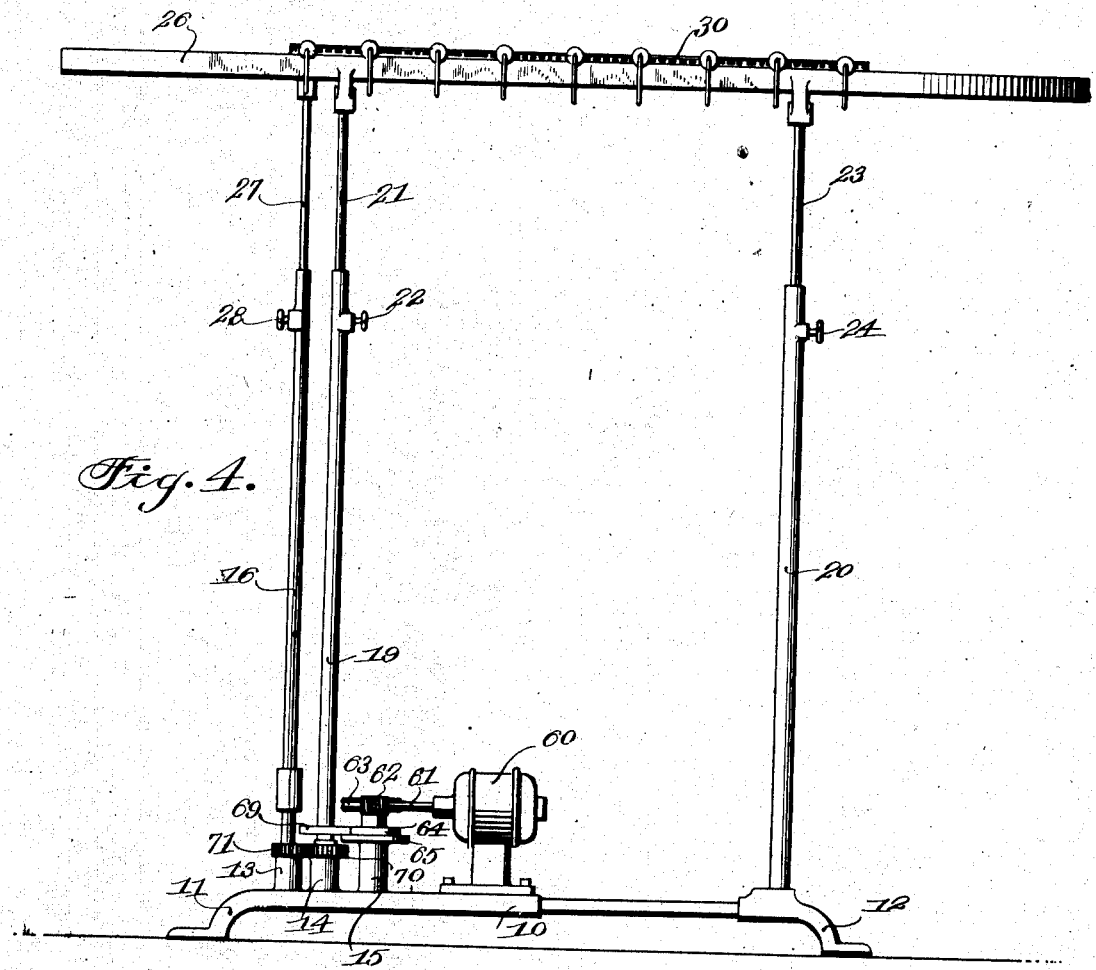

June 11, 1929.  A. PERLING  1,717,246
DISPLAY DEVICE
Filed Nov. 1, 1927   5 Sheets-Sheet 1
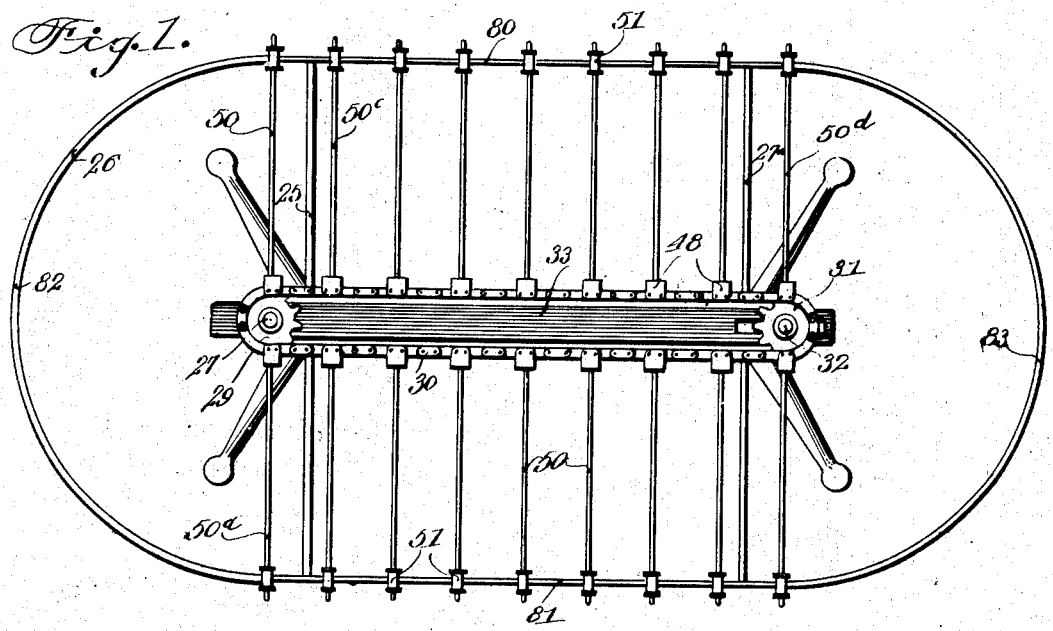
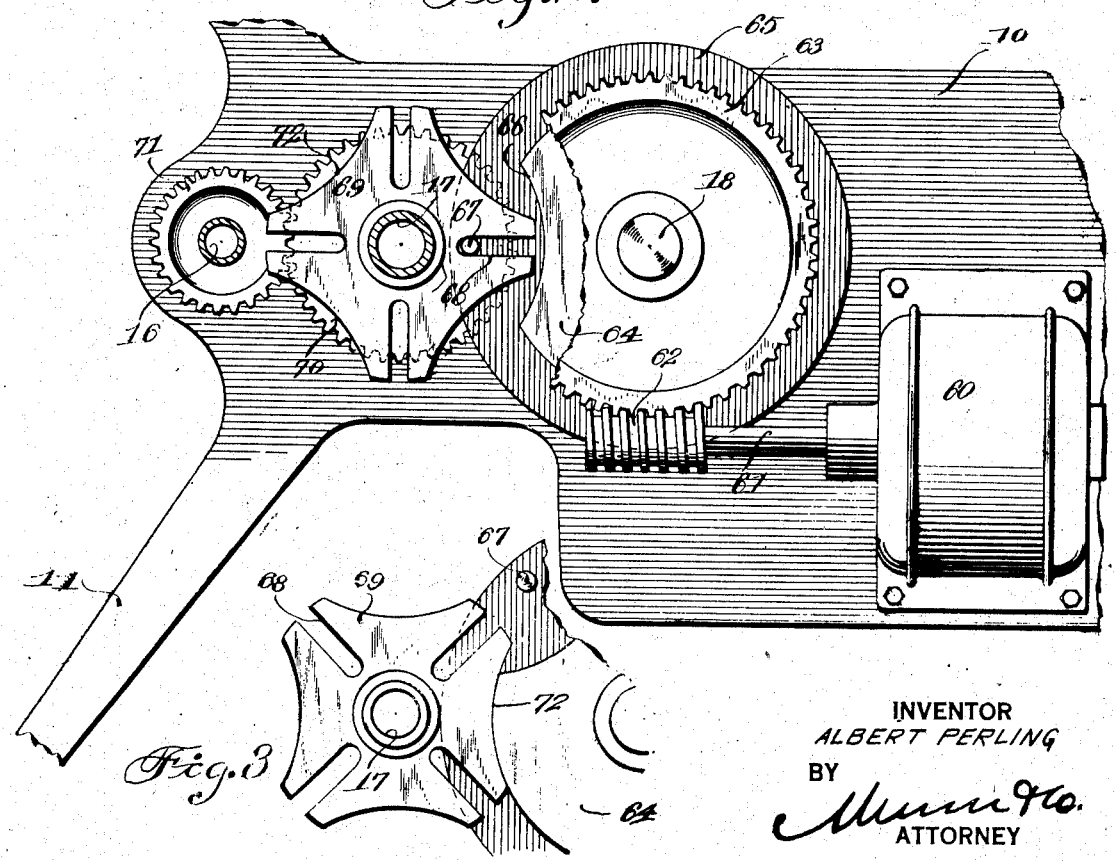
INVENTOR
ALBERT PERLING
BY
ATTORNEY June 11, 1929.　　　　　A. PERLING　　　　　1,717,246
DISPLAY DEVICE
Filed Nov. 1, 1927　　　5 Sheets-Sheet 2

INVENTOR
ALBERT PERLING
BY
ATTORNEY

June 11, 1929. A. PERLING 1,717,246
DISPLAY DEVICE
Filed Nov. 1, 1927 5 Sheets-Sheet 3
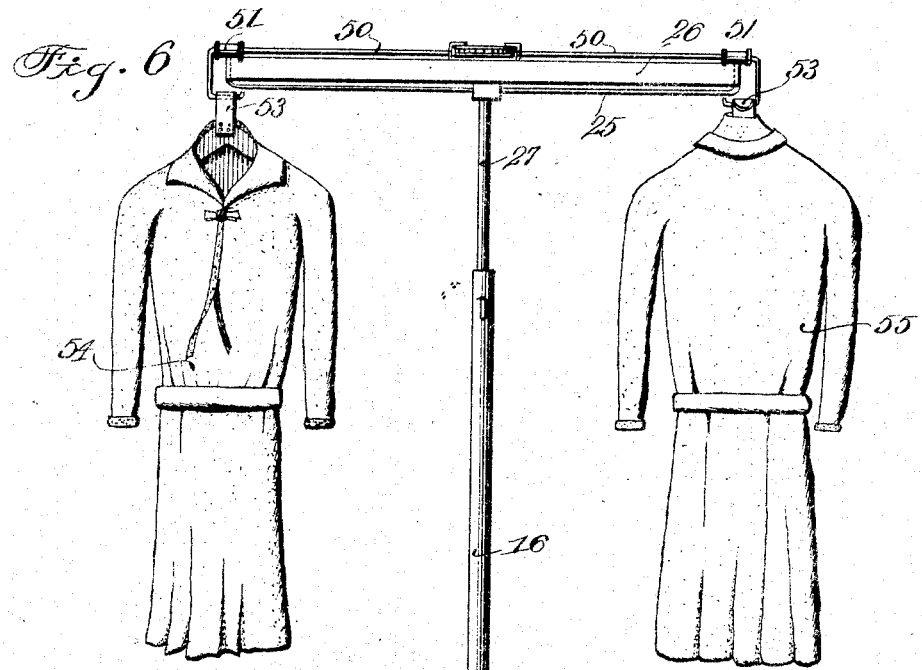
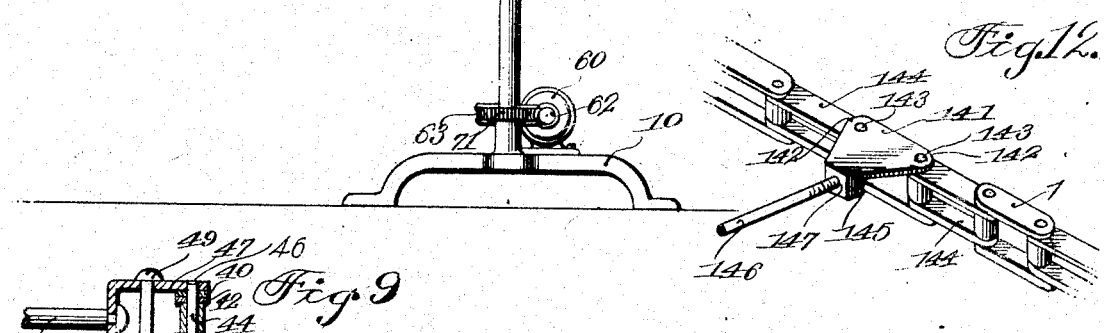
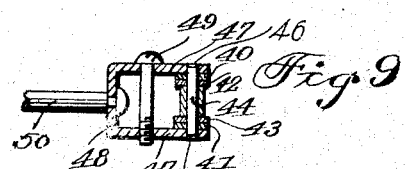
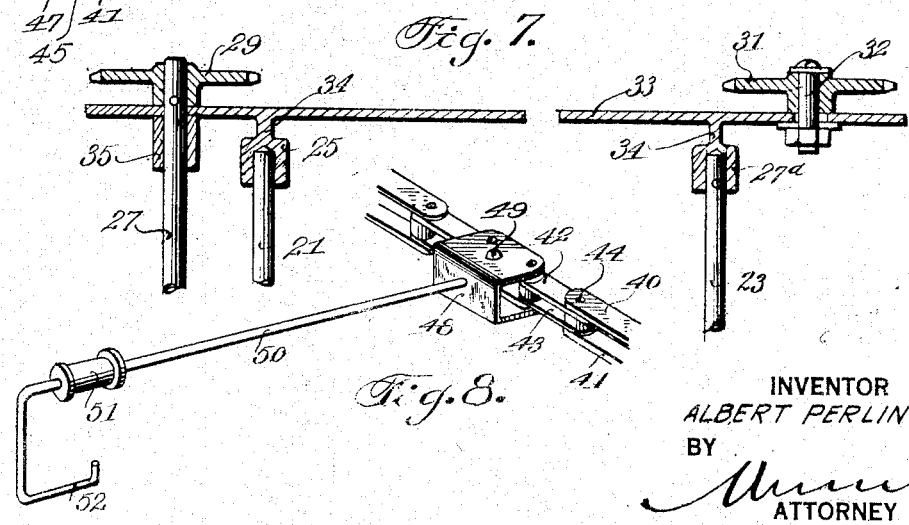
INVENTOR
ALBERT PERLING
BY
ATTORNEY

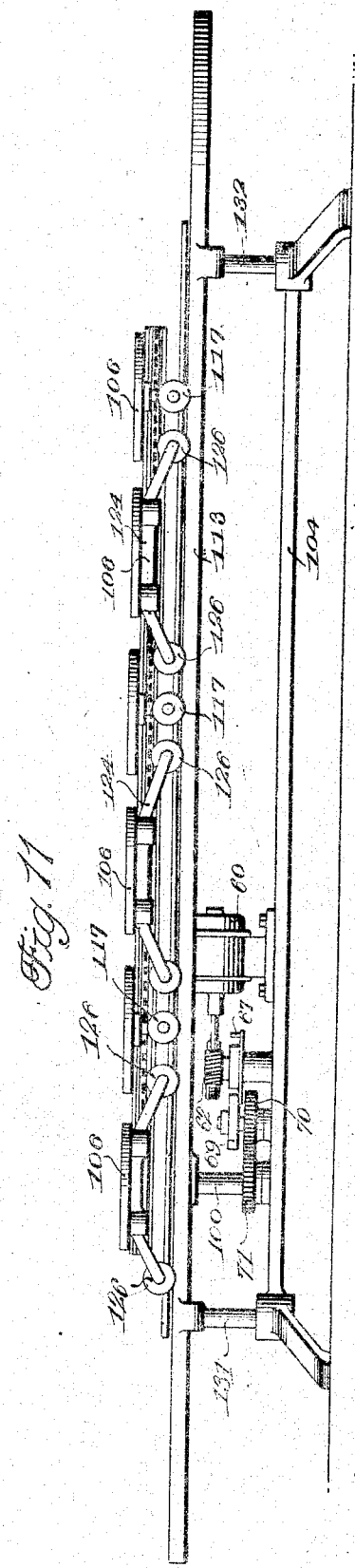

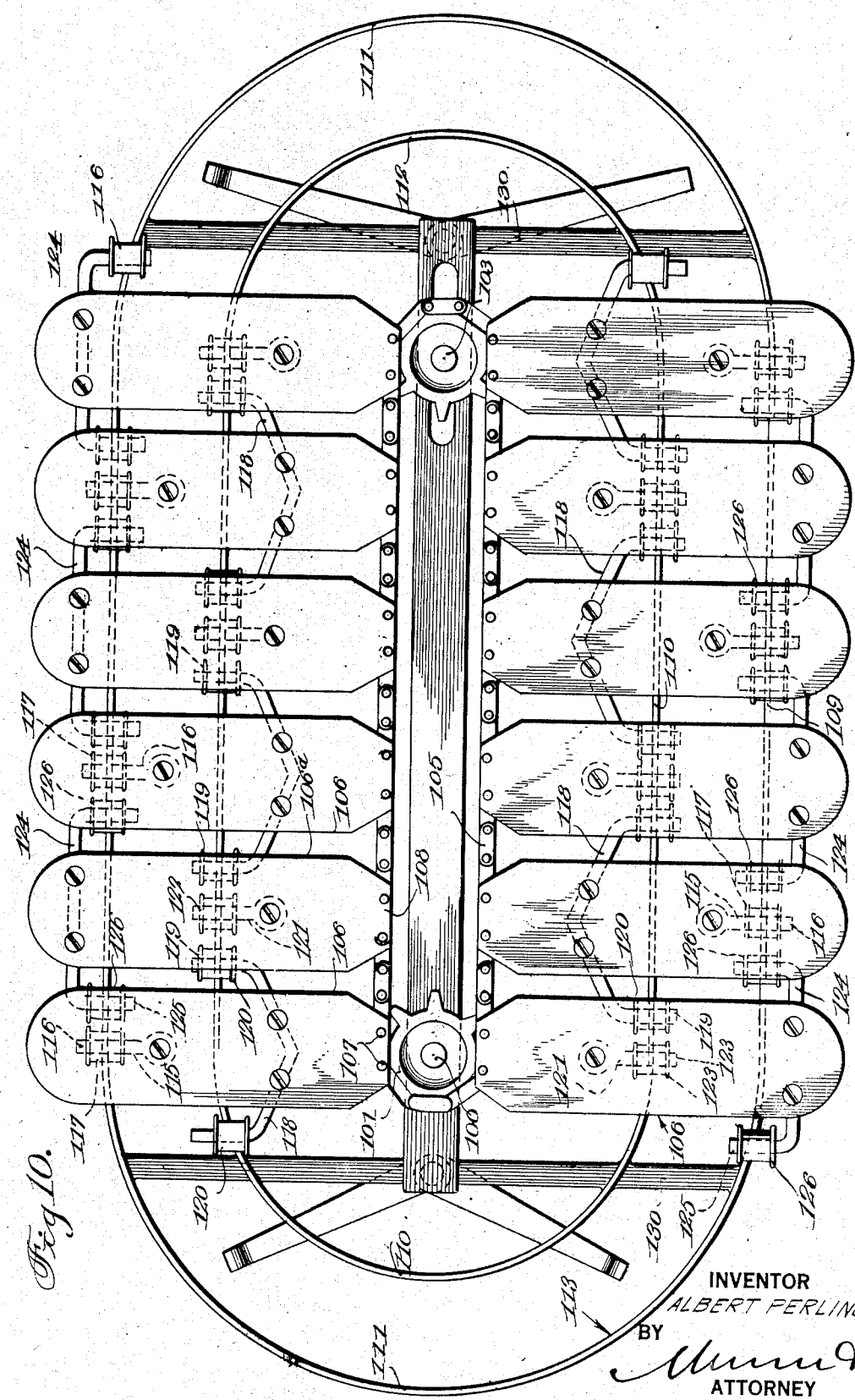

Patented June 11, 1929.

1,717,246

UNITED STATES PATENT OFFICE.

ALBERT PERLING, OF PARIS, KENTUCKY.

DISPLAY DEVICE.

Application filed November 1, 1927. Serial No. 230,313.

This invention relates to a display device.

An object of the invention is the provision of a device which is adapted to be employed in a show window of a store for displaying articles to passers-by to attract attention to the article and in which a series of the articles are moved to view and retained in such position periodically.

Another object of the invention is the provision of a device for displaying articles in a show window or in a store whereby the articles are moved to view and retained in such position periodically, the operation being intermittent and driven by any well known motive power, such as an electric motor.

A further object of the invention is the provision of a display rack in which a plurality of arms or tables are moved in parallel relation upon opposite sides of a driven chain and then through an arc of a circle at the ends of the rack whereby articles carried by the arms or tables are disclosed on all sides and are retained at the end of the longitudinal parallel movement for a predetermined length of time in order to give customers an opportunity to view the articles.

This invention will be best understood from a consideration of the following detailed description in connection with the accompanying drawings; nevertheless, it is to be understood that the invention is not confined to the disclosure being susceptible of such changes and modifications as shall define no material departure from the salient features of the invention as expressed in the appended claims.

In the drawings:—

Figure 5:
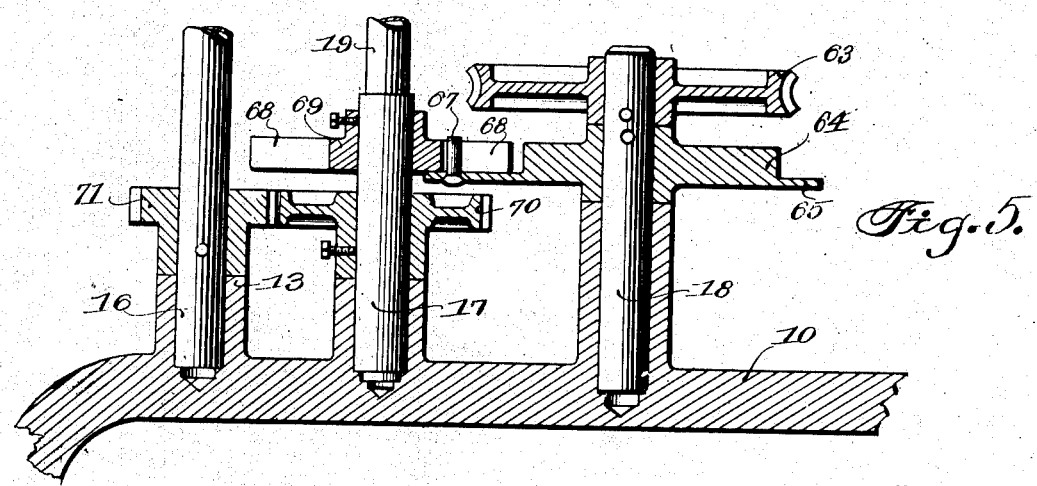

Figure 1 is a plan view of a display rack constructed according to the principles of my invention, Figure 2 is a fragmentary horizontal section of the operating mechanism for the display rack, Figure 3 is a fragmentary plan view showing the timing mechanism in the different positions from that shown in Fig. 2, Figure 4 is a side elevation of the rack shown in Fig. 1, Figure 5 is a fragmentary vertical section of the operating mechanism shown in Fig. 2, Figure 6 is an end view of the rack showing wearing apparel supported thereby, Figure 7 is a fragmentary vertical section of the operating means for the article carriers, Figure 8 is a view in perspective of one of the article carriers attached to a chain, Figure 9 is a transverse section through a ring, Figure 10 is a plan view of a slightly modified form of the invention, Figure 11 is a side view of the same, Figure 12 is a fragmentary view in perspective of a modified form of chain carrying the supporting arms, Figure 13 is a transverse vertical section of the form shown in Fig. 10, Figure 14 is a fragmentary view in perspective of the modified form of support shown attached to a chain.

Referring more particularly to the drawings 10 designates a base member which is elongated and provided with legs 11 and 12. The base member, as shown at 13, 14 and 15, is provided with sockets, respectively receiving the shafts 16, 17 and 18.

A standard 19 rises from the base member 10 and is supported thereby while a hollow standard 20 is secured to the leg 12 and extends in parallel relation with the hollow standard or shaft 19. A rod 21 is slidably mounted in the hollow post 19 and is adapted to be secured in an adjusted position by means of a set screw 22. A rod 23 is slidably mounted in the post 20 and is likewise adapted to be secured in an adjusted position by a set screw 24. Secured to the upper end of the rod 21 is a transverse supporting bar 25 which has its end secured to a track generally designated by the numeral 26 at the forward end of said track. A transverse supporting bar 27ª is secured intermediate its ends to the upper end of the rod 23 and has its ends secured to the lower edges of the rear portion of the track 26.

The hollow driving shaft 16 has a shaft 27 slidably mounted in the upper end thereof and is adapted to be secured to the shaft by means of a set screw 28 and may be adjusted longitudinally of the shaft 16 when the rods 21 and 23 are adjusted longitudinally of their respective posts 19 and 20. A sprocket 29 is secured to the shaft 27 around which a chain 30 is trained. An idling sprocket 31 receives the rear portion of the chain and is mounted on an axle 32 which is supported at the rear end of a bar 33. The bar 33 as shown at 34 is connected to the transverse bars 25 and 27. A bearing 35 is secured to the under face of the forward end of the bar 33 and receives the upper end of the shaft 27.

The chain 30 consists of a plurality of links 40, 41, 42 and 43 pivotally connected together on a pin 44. This pin, as shown at 45, projects beyond the outer face of the links 40, 41 and is received within openings 46 in the legs 47 of a U-shaped member 48. A bolt 49 passes through perforations in the legs 47 and is threaded into one of the perforations whereby the legs may be moved towards or away from each other and maintained in proper relation with the ends 45 of the pin 44 so that the U-shaped member is maintained on the chain in this manner.

A rod 50 has its inner end swivelled in the U-shaped member 48 and extends outwardly over the track where it is provided with a flange roller 51 adapted to ride over the track. A hook 52 depends from the outer end of the rod and is adapted to receive some form of attaching means, as shown at 53 for supporting a suit or dress hanger upon which is adapted to be carried clothes for display in a show window, as shown at 54 and 55 in Fig. 6.

The mechanism for causing rotation of the shaft 16 consists of a motor 60 having a shaft 61 which is provided with a screw 62 in mesh with a worm gear 63 rigid with the upper end of the shaft 18. A wheel 64 is provided with a peripheral flange 65 and a cut out portion 66 for a purpose which will be presently explained. The flange 65 adjacent the outer portion is provided with an upstanding pin 67 which is adapted to be received periodically within a radial slot 68 of a timing member 69. This member is rigid with the shaft 17 and is adapted to rotate said shaft periodically and also a gear 70 which is rigid with the shaft 17 and meshes with a gear 71 secured to the shaft 16. The member 69 has arcuately shaped depressions 72 which are adapted to be received at times by the circular portion of the wheel 64.

The operation of my device is as follows:

Dresses or suits of clothes may be suspended from the hangers 53 with one suit or a dress facing forwardly while the same type of dress or suit is suspended from a hanger 53 as shown at 55, and reversed in position so that the rear portion of the same type of suit or dress will be exposed to view simultaneously with the front portion. The motor 60 is set in operation which causes rotation of shaft 61, worm 62, worm gear 63 and wheel 64. The member 69 is normally maintained stationary and is in the position shown in Fig. 3, so that the pin 67 will be received by a slot 68 in the member 69 when the pin arrives at such point and is moved into the slot. Otherwise the circular portion of the member 64 moves into contact with an arcuately shaped cut out portion 72. As the pin is carried around by the member 65 the member 69 will be revolved until the pin 67 leaves the slot 68 thereby leaving the member 69 in the position shown in Fig. 3, so that when the pin 67 returns to its operative position for engaging the next succeeding slot 68, the member 69 will again be rotated. At each partial revolution or intermittent rotation of the member 69 the gearings 70 and 71 will revolve and likewise the shaft 16. As the shaft 16 is revolved the sprocket 29 is rotated driving the chain 30 so that the rod 50$^a$ as shown in Fig. 1 is moved in the direction indicated by the arrow until it reaches the diametrically opposite position, as shown at 50$^b$. The rod 50$^c$ at this time is moved rearwardly while the rod 50$^a$ has been advanced. At each movement of a rod at the forward end of the device, which is through an arc of 180° a rear rod 50$^d$ is also moved through an arc of 180° and changes from one position to a diametrically opposite position. While the member 64 is being revolved and the member 69 is in the position shown in Fig. 3, the circular portion of the member 64 will revolve within the arcuately shaped portion 72 of the member 69 without causing rotation of the member 69. At this time all of the members 50 to 50$^d$ remain stationary and the garments, as shown in Fig. 6, are periodically retained on display.

When the U-shaped members 48 and likewise the rods are moved the rollers 51 revolve on the track 26. The weight of the garments in this manner is supported by the rollers 51 on said track.

In the modified form shown in Figs. 10 and 11 a similar construction of operating means for the chain and sprockets is employed while a slight modification of the track and supporting rods is made in order that the device may be converted into such use that other articles which must necessarily be supported on a table may be displayed to view.

The operating mechanism of this form includes a motor 60, worm 62, worm gear 63, disk 64, flange 65 and the rotatable member 69 having the slotted portion and the gears 70 and 71. Gear 71 drives a shaft 100 and the sprocket 101 which is rigid with the upper end of the shaft 100. A second sprocket 102 is mounted for rotation on an axle 103 which is carried by the base member 104. The motor and operating mechanism just described is also carried by the base member. A chain 105 is trained around the sprockets 101 and 102 and is driven by the sprocket 101.

A plurality of horizontally disposed article supports 106 are connected at 107 to the pins of the links 108 of the chain 105 and are normally disposed in spaced parallel relation upon opposite sides of the parallel portions of the tracks 109 and 110. These supports are in the shape of flat bars upon which are adapted to be mounted any kind of bracket for maintaining the article on the supports. These supports are adapted to be revolved around the oppositely disposed semi-circular portions 111 and 112 respectively of the tracks 109 and 110.

The outer end of one support is provided with a bracket 115 secured to the under face of the support and has an axle 116 located in parallel relation with the support upon which is mounted a flanged roller 117, the axle being of sufficient length to provide for sliding of the roller on the axle. A second bracket 118 of U-shaped formation is secured to the inner end of the same support and is provided with axles 119 of sufficient length to permit the rollers 120 to slide thereon. The ends of the brackets are bent downwardly sufficiently to permit the roller to freely move below the support. Each of the next adjacent supports, has a bracket 121 secured to the under face and adjacent the inner end and is provided with an axle 122 on which is rotatably mounted a roller 123 adapted to rest on the track 109. A second bracket 124 is U-shaped in formation and has its ends bent downwardly and provided with an axle 125 of sufficient length to permit rollers 126 to revolve thereon and to slide longitudinally of the axle when the support is moved over the semi-circular portions 111 of the track 109. It will be noted that the single brackets 115 and 121 are disposed either at the inner end or outer end of the support and in alternate relation throughout the series of supports. This is also true of brackets 118 and 124. The brackets 118 have their arms bent inwardly at an angle and towards the track 110.

It will be noted that the tracks are supported by horizontal bars 130 secured to the under face of each track and the forward bar is carried by a post 131 while the rear horizontal bar is carried by a post 132.

The operation of the modified form of the device is similar in all respects to the operation of the form shown in Figs. 1 to 9 inclusive and it appears unnecessary to describe the operation of the member 69 which is slotted radially and at 90° apart which slots are adapted to be engaged by a pin 67 on the member 65. The supports 106 are normally maintained stationary for one revolution of the gear 63 and in parallel relation laterally upon opposite sides of the parallel portions 109 and 110 of the tracks so that the forward supports will be retained against motion at the forward end of the display device for a predetermined period in order to give the customers or passers-by sufficient time to observe the article placed on the supports.

The track 26 is continuous and elongated having two parallel sections 80 and 81 and two semi-circular portions 82 and 83 at the ends thereof.

In the modified form of the link shown in Fig. 12, one of the links of alternate sections of a chain may be formed in a triangularly shaped plate 141 which has two of its opposite corners 142 perforated to receive the upper ends of the pins 143. This plate constitutes an expansion of a link instead of a separate plate as previously described. Links 144 are also pivotally mounted on the pins 143 and form the intermediate sections of the chain between the sections which have the plates 141. The free end of the plate 141 is provided with an enlargement or boss 145 having an internally threaded passage to receive a supporting arm 146 which is threaded at 147 and screwed into a threaded passage in the boss 145. This modified form presents the simplest device in that the plates are directly included in the chain and is a substitute for the U-shaped members in Figs. 1 to 8 inclusive.

I claim:—

1. A display rack comprising a base member, a track supported by the base member and having parallel portions and semi-circular portions connecting the opposite ends of the straight portions, a sprocket at each end of the track, a chain trained on the sprockets, article supports connected to the chain at diametrically opposite points and normally positioned in parallel relation outwardly of the parallel portions of the track during the time the semi-circular portions are free of said supports, means for causing periodic rotation of the sprockets and a step by step movement of the supports so that when one of the supports is moving through a semi-circular portion of the track the remaining supports are moving one step along the parallel portion of the track.

2. A display rack comprising a base member, a track supported on the base member and having parallel portions and semi-circular portions connecting the opposite ends of the straight portions, a sprocket at each end of the track, a chain trained on the sprockets, article supports connected to the chain in spaced relation and normally disposed in parallel relation laterally from the parallel portions of the track during the time that the semi-circular portions are free of said supports, a pair of supports at each end of the track being disposed at diametrically opposite points from the sprockets, means for causing periodic rotation of the sprockets, and a step by step movement of the supports, the supports being spaced a distance apart which will permit a support at each end of the track to be moved through 180° when the remaining supports are moved a step along the parallel portion of the track.

3. A display rack comprising a stationary track having parallel portions and semi-circular portions connecting the opposite ends of the straight portion, a sprocket at each end of the track, a chain trained on the sprockets, article supports connected to the chain and normally located laterally in parallel relation of the parallel portion of the track during the time that the semi-circular portions are free of said supports, means for causing one of the sprockets to be moved through 180° after which the sprocket is retained at rest for a predetermined period, the supports being spaced a distance apart which will permit one of the supports at each end of the track to be moved around a semi-circular portion of the track while the remaining supports are moved one step equal to the distance between the supports.

Signed at Paris, in the county of Bourbon and State of Kentucky, this 20th day of October, A. D. 1927.

ALBERT PERLING.